United States Patent [19]
Butler

[11] Patent Number: 5,457,818
[45] Date of Patent: Oct. 10, 1995

[54] DETECTION THRESHOLD ADJUSTMENT METHOD FOR LINEAR MATCHED FILTER RECEIVERS

[76] Inventor: James A. Butler, 2 Phillippi Creek Dr., Elgin, Ill. 60120

[21] Appl. No.: 908,843

[22] Filed: Jul. 1, 1992

Related U.S. Application Data

[63] Continuation of Ser. No. 534,992, Jun. 8, 1990, abandoned.

[51] Int. Cl.$^6$ ..................................................... H04B 1/16
[52] U.S. Cl. ......................... 455/227; 455/226.3; 327/72
[58] Field of Search ..................... 455/67.1, 67.3, 455/225, 226.2, 226.3, 227, 228, 229, 213; 328/137, 138; 307/522; 375/102; 364/724.16, 724.19; 340/825.73, 825.74; 327/40, 44, 72

[56] References Cited

U.S. PATENT DOCUMENTS

| | | | |
|---|---|---|---|
| 3,937,899 | 2/1976 | Denenberg | 328/138 |
| 4,258,423 | 3/1981 | Lane et al. | 328/138 |
| 4,479,252 | 10/1984 | Souchay et al. | 455/229 |
| 4,561,115 | 12/1985 | Pfeifer | 455/228 |
| 4,626,629 | 12/1986 | Premoli et al. | 328/138 |
| 4,677,466 | 6/1987 | Lert, Jr. et al. | 455/67 |
| 4,685,149 | 8/1987 | Smith et al. | 455/54.2 |

*Primary Examiner*—Edward F. Urban
*Attorney, Agent, or Firm*—Daniel C. Crilly; Jon P. Christensen

[57] ABSTRACT

A signal detection system wherein the detection of the presence of a signal does not depend on the absolute magnitude of the desired signal but does depend on a system whereby the total relative signal energy received is compared with the relative energy within a desired frequency band. If the relative energy within the desired frequency is above a threshold proportional to the total then the desired signal is determined to be present.

14 Claims, 1 Drawing Sheet

DETECTION THRESHOLD ADJUSTMENT METHOD FOR LINEAR MATCHED FILTER RECEIVERS

This is a continuation of application Ser. No. 07/534,992, filed Jun. 8, 1990 and now abandoned.

TECHNICAL FIELD

This invention relates generally to the field of communication systems and more specifically to radio frequency receivers.

BACKGROUND OF THE INVENTION

Radio receivers are known. Such receivers are constructed to receive signals on a designated frequency. As the number of transmitters and receivers has increased competition for the use of designated frequencies has increased. Because of the competition for radio spectrum efforts have been made to increase the efficiency of radio channel use. Methods of accomplishing this objective include time division multiplexing, conversion of voice and other signals into a digital format, and so forth. By increasing the data transmission rates a given radio transmitter does not need to transmit for as long a time period to transmit the same amount of information. Reduced transmission time periods allows an increased number of radios to operate on the same designated frequency.

While an increase in the information rate increases the efficiency of radio channel use, radio receivers must be constructed to receive information at the increased rate. Radio receivers, in fact, have been constructed to receive information at high data rates. These radios operate well and with small error rates under most conditions. A problem, on the other hand, arises in high speed data transmissions when there are a large number of transmitters sharing the same channel and each transmitter is only allowed to operate for short periods. Under these conditions intended receivers must quickly detect a desired transmission and synchronize to that transmission to receive the transmitted information.

All receivers operating on a given frequency must quickly decode every transmission to determine if a given transmission is intended for that receiver. An inability to detect a given transmission results in a need for a transmission to be repeated. Repeated transmissions result in reduced efficiency.

Reduced efficiency also results, on the other hand, where relatively long time periods are allowed receivers to detect and to synchronize with a transmitted signal.

In the past the detection of signals has been based upon a technique of measuring the magnitude of a received signal. The difficulty with the technique lies in the suitable selection of a detection threshold particularly in a TDM environment where the desired signals may have widely varying intensities, and/or the desired signal occurs immediately before or after another signal (perhaps undesired) of significantly different amplitude than the desired signal. In such an environment if the detection threshold is set too low, a strong interfering signal may trigger the detector; conversely, if the threshold is set too high then desired signals may go undetected. A need therefore exists for a method which can accurately detect the desired signal through other means.

Digital signal processing is known in the art. Digital techniques provide a method of gathering data about a time varying signal, possibly utilizing a computing device such as a microprocessor or digital signal processor. As is known the frequency of data sampling must be at least twice the bandwidth of the sampled signal to obtain an accurate representation of the signal. When such procedures are followed, accurate and reproducible signal data can be gathered.

The equation $$\left| \sum_{i=0}^{n} C_i X_i \right|^2 \leq \left| \sum_{i=0}^{n} C_i \right| \left| \sum_{i=0}^{n} X_i \right|$$

is also well known to those familiar in the art of communication systems. As is known the terms $C_i$ and $X_i$ are digital representations of two time varying signals (C and X). Also, as is known, the left hand term in the above equation equals the right hand term (the product, $C_i X_i$, is largest) when $C_i = X_i^*$ (where $X_i^*$ is the complex conjugate of $C_i$).

By virtue of the above relation, the terms ($C_i$) representing a known signal (C), can be used to identify the presence of a desired signal, X. Specifically, when the above equation becomes an equality then the signal X (represented by sampled digital values $X_i$) is substantially identical to the signal C (represented by the values, $C_i$). Substantial equality of values ($C_i = X_i$), in this context, identifies the presence of the desired signal, X. Identification of the desired signal through application of terms ($C_i$) representing the known signal (C) is known in the art as applying a matched filter to the unknown signal (X). The differences between matched filters and bandpass filters are well known in the prior art (see Principles of Communication Engineering, by Wozencraft and Jacobs, Wiley, N.Y., 1965, p. 234).

SUMMARY OF THE INVENTION

Digital sampling and the above equation are used in the instant invention to identify the presence of a desired signal even though the desired signal is intermixed with undesirable signals of a larger magnitude or the desired signal is in TDM format of varying magnitudes. The procedure used involves storing a signature of the desired signal in the form of a first set of values ($C_i$), called coefficients, in a table of coefficients within a computer memory and then looking for the signature of the desired signal in a received signal. The method involves computing the values of all terms in the above equation, where the values of $C_i$ are stored values and the values of $X_i$ are sampled digital values representative of the received, unknown signal. As in the above equation, an equality exists when the received, unknown signal terms $X_i$, substantially match the stored signal terms $C_i$.

In one embodiment, because transmitted signals contain varying amounts of energy a two-step process compensates for the effects of the varying energy. The two-step process begins by generating a second set of coefficients ($X_i$) through sampling of the unknown signal and at the same sample rate used to generate the first set of coefficients. (A sampling rate conversion process is used to compensate for differences in sampling rates so that the values $X_i$ and $C_i$ are the result of essentially identical sampling rates.) The total relative energy within the unknown signal is determined by squaring the absolute values of the $X_i$ terms and summing the result.

The relative energy of the unknown signal within a desired frequency bandwidth is next determined by applying a simulated matched filter to the unknown signal thereby attenuating the undesired energy elements. The filtering of the unknown signal through the application of a simulated matched filter is accomplished by multiplication of the components of the first set of coefficients ($C_i$) by the corresponding components of the second set of coefficients ($X_i$) and summing the result. A determination of difference of the relative energies between the two calculated, summed values can then be used to identify the presence of the desired signal.

In another embodiment analog computers may be used to perform the above calculations and to identify the desired signal. The signature of the desired signal may be stored in the form of discrete components. The signature of the desired signal may be created by, or be implicit in, the design of appropriately chosen electrical components, e.g., resistors, capacitors, inductors, surface acoustic wave devices, tapped delay lines and the like, either discrete or integrated.

BEST MODE FOR CARRYING OUT THE INVENTION

Figure 1:
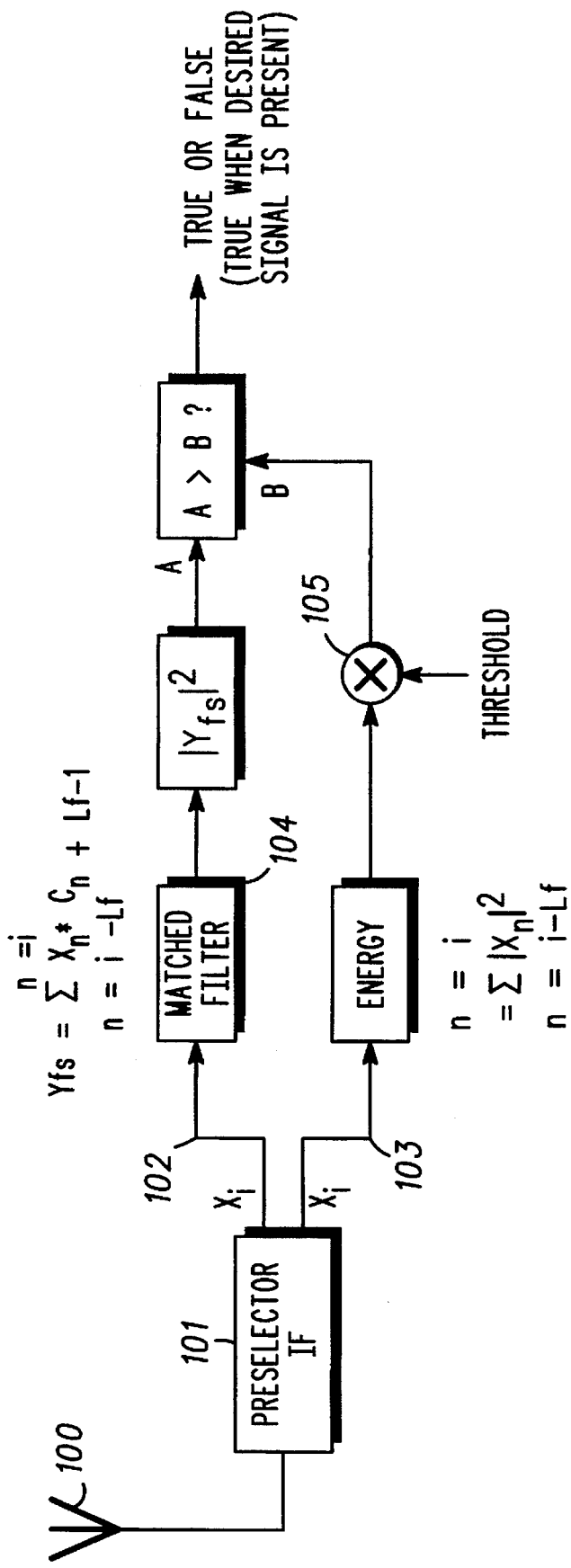
FIG. 1 is a block diagram of the signal processing involved in the subject invention.

All sampling done as a part of the described invention involves digital sampling techniques. Digital sampling techniques require that for signals (C and X) to be compared that C and X be sampled at the same rate. It is assumed that as a part of the instant invention a prior analysis has been performed on a desired radio frequency information signal (C) whereby, using digital sampling, a set of coefficients ($C_i$) comprising a matched filter have been generated and have been stored in memory as a table of coefficients all in accordance with well understood prior art technique.

It could be assumed, on the other hand, that the coefficients ($C_i$) need not have been previously generated and stored. The coefficients ($C_i$) could, in fact, be generated at the beginning of each analysis by an appropriate routine and only used for that particular analysis.

The generation of the coefficients ($C_i$) are subject to data manipulations to enhance the ability of the invention to receive and to detect specific frequencies or ranges of frequencies. The data manipulations may be necessary to compensate for nonlinearities within the receiver or to compensate for other external conditions. The coefficients ($C_i$) may, in fact, have been generated on an experimental basis using a routine developed for that purpose involving some or all of the above described data manipulations.

Referring now to FIG. 1, an antenna (100) and preselector—IF section (101) are used to receive and process an analog signal from a transmitted frequency down to an IF frequency, all as well known in the art. From the pre-selector—IF section (101) the signal ($X_i$) is processed through the use of a first and a second path (102 and 103) where digital signal processing techniques are applied to evaluate signal strength by the use of separate methods. The first path (102) attenuates the undesired, relative energy contained in frequencies outside the desired bandwidth and then measures the remaining relative energy. The second path (103) measures the total relative energy within the received, unknown signal. The results of the two paths are then compared and the presence of the desired signal is determined by comparison to a previously determined threshold value.

The first path (102) for the signal ($X_i$) uses a matched filter (104) to attenuate undesired energy elements in frequencies outside the desired bandwidth. The unknown signal represented by the second set of coefficients ($X_i$) are each operated upon within the matched filter through multiplication ($X_n * C_{n+Lf-i}$) by the corresponding coefficient of the constant ($C_i$) and summed to produce a result ($Y_{fs}$).

$$Y_{fs} = \sum_{n=i-Lf}^{n=i} X_n * C_{n+Lf-i}$$

The absolute magnitude of the result ($Y_{fs}$) is then squared ($A = |Y_{fs}|^2$) to form the signal (A) which represents a moving average of the total relative energy within the desired bandwidth passing through the matched filter.

The second path (103) for the signal $X_i$ determines a moving average of the total relative signal energy within the unknown signal ($X_i$). Samples are taken at the same data rate as used above. The results are squared and summed to form a result ($\Sigma |X_n|^2$) over the same range as in the previous analysis (n=i-Lf to n=i). The result is then scaled (105) to a threshold value to form a resultant signal (B).

The presence of the desired signal (C) is determined by a comparison of signals A and B to establish whether a threshold proportional difference exists between A and B. If signal A is larger than the scaled, signal B, it can be said that the desired signal is present within the waveform.

In another embodiment of the invention the analog signal arrives at the receiver as digital samples, i.e., after having been digitized through some process inherent in the channel or signal source and not necessarily part of the receiver itself. (An example of such a process is where the signal is digitized before transmission over a medium to the receiver.) The set of values $X_i$ presented to the receiver are of an unknown signal, and may be presented in the form of data words forming a digitized data stream. In such a case the received values are processed, as above, to detect the presence of the desired signal.

I claim:

1. An apparatus for the detection of a desired radio frequency information signal within a radio frequency subspectrum subsumed by the desired radio frequency information signal and by undesired signal elements, such apparatus comprising:

A. means for receiving the radio frequency subspectrum which, upon occasion, contains the desired radio frequency information signal and the undesired signal elements;

B. means, operably coupled to the means for receiving, for generating a set of coefficients of a sampled data stream by sampling the radio frequency subspectrum;

C. a memory containing a table of coefficients characterizing a matched filter designed for the desired radio frequency information signal, the matched filter having a time duration substantially equal to a time duration of the desired radio frequency information signal;

D. means, operably coupled to the means for generating, for accumulating a moving average of total relative energy within the sampled data stream, such average comprising a first reference signal:

E. means, operably coupled to the means for generating, for multiplying a coefficient of the set of coefficients of the sampled data stream with a corresponding coefficient within the table of coefficients thereby attenuating the undesired energy elements, accumulating a sum and squaring an absolute magnitude of the result to create a second reference signal comprising total relative energy of the desired radio frequency information signal within a desired bandwidth; and F. means for receiving and comparing the first reference signal and the second reference signal and determining the presence of the desired radio frequency information signal based on a threshold proportional difference between the first and the second reference signals.

2. The apparatus of claim 1 wherein the table of coefficients is determined experimentally.

3. An apparatus for the detection of the presence of a desired radio frequency information signal within a radio frequency subspectrum subsumed by the desired radio frequency information signal and by undesired signal elements, such apparatus comprising:

A. means for receiving a set of coefficients of a digitized data stream containing the desired radio frequency information signal and the undesired signal elements from an external source;

B. a memory containing a table of coefficients characterizing a matched filter designed for the desired radio frequency information signal, the matched filter having a time duration substantially equal to a time duration of the desired radio frequency information signal;

C. means, operably coupled to the means for receiving, for accumulating a moving average of total relative energy within the digitized data stream, such average comprising a first reference signal;

D. means, operably coupled to the means for receiving, for multiplying a coefficient of the set of coefficients of the digitized data stream with a corresponding coefficient within the table of coefficients thereby attenuating the undesired energy elements, accumulating a sum, and squaring an absolute magnitude of the result to create a second reference signal comprising total relative energy of the desired radio frequency information signal within a desired bandwidth; and E. means for receiving and comparing the first reference signal and the second reference signal to determine the presence of the desired radio frequency information signal based on a threshold proportional difference between the first and the second reference signals.

4. The apparatus of claim 3 wherein the table of coefficients is determined experimentally.

5. A method of detecting a transmitted radio frequency information signal within a subspectrum subsumed by the transmitted radio frequency information signal and undesirable signal elements, such method comprising the steps of:

A. accumulating a moving average of total relative energy within a sampled data stream of the subspectrum, such average comprising a first reference signal;

B. multiplying a coefficient of a received set of coefficients of the sampled data stream by a corresponding coefficient within a table of coefficients forming a matched filter designed for the transmitted radio frequency information signal, thereby attenuating the undesirable signal elements, accumulating a sum, and squaring an absolute magnitude of the result to create a second reference signal comprising total relative energy of the transmitted radio frequency information signal within a desired bandwidth, wherein the matched filter has a time duration substantially equal to a time duration of the transmitted radio frequency information signal; and C. comparing the first reference signal and the second reference signal to determine the presence of the transmitted radio frequency information signal based on a threshold proportional difference between the first and the second reference signals.

6. The method of claim 5 wherein the table of coefficients is determined experimentally.

7. A method of detecting the presence of a desired radio frequency information signal within a subspectrum subsumed by the desired radio frequency information signal and undesired signal elements, such method comprising the steps of:

A. accumulating a moving average of total relative energy within a digitized data stream of the subspectrum, such average comprising a first reference signal;

B. multiplying a coefficient of a received set of coefficients of the digitized data stream with a corresponding coefficient within a table of coefficients forming a matched filter designed for the desired radio frequency information signal, thereby attenuating the undesired signal elements, accumulating a sum, and squaring an absolute magnitude of the result to create a second reference signal comprising total relative energy of the desired radio frequency information signal within a desired bandwidth, wherein the matched filter has a time duration substantially equal to a time duration of the transmitted radio frequency information signal; and C. comparing the first reference signal and the second reference signal to determine the presence of the desired radio frequency information signal based on a threshold proportional difference between the first and the second reference signals.

8. The method of claim 7 wherein the table of coefficients is determined experimentally.

9. A method of detecting a desired signal within a received signal containing the desired signal and undesired signals, such method comprising the steps of: filtering the undesired signals of the received signal within a matched filter to attenuate the undesired signals and squaring an absolute value of the result within a first signal processing path to produce a first relative energy value, wherein the matched filter has a time duration substantially equal to a time duration of the desired signal; squaring the received signal and multiplying the product by a scaling factor within a second signal processing path to produce a scaled relative energy value; and detecting the desired signal when the first relative energy value exceeds the scaled relative energy value.

10. The method of claim 8 further including the step of generating a plurality of coefficients of a matched filter representative of the desired signal.

11. The method of claim 10 further including the step of digitally sampling the received signal to produce a plurality of sample values equal in number to the plurality of coefficients.

12. The method of claim 11 wherein attenuating the undesired signals through application of the matched filter further includes multiplying corresponding coefficients and samples of the plurality of coefficients and samples and summing the result.

13. A method of detecting a desired signal within a received signal containing the desired signal and undesired signals, such method comprising the steps of: digitally sampling the received signal to produce a plurality of representative sample values; filtering the undesired signals of the received signal within the plurality of representative sample values through application of a matched filter to attenuate the undesired signals and squaring an absolute value of the result within a first signal processing path to produce a first relative energy value, wherein the matched filter has a time duration substantially equal to a time duration of the desired signal; squaring a vector representation of the plurality of representative sample values of the received signal and multiplying the product by a scaling factor within a second signal processing path to produce a scaled relative energy value; and detecting the desired signal when the first relative energy value exceeds the scaled relative energy value.

14. A method of detecting a desired radio frequency information signal within a radio frequency subspectrum subsumed by the desired radio frequency information signal and by undesired signal elements, such method comprising the steps of: measuring a relative energy of the desired radio frequency information signal by match filtering the subspectrum to attenuate the undesired signal elements and squaring an absolute value of the match filtered result, wherein the matched filtering is performed for a time duration substantially equal to a time duration of the desired radio frequency information signal; measuring a total relative energy of the subspectrum; and determining the presence of the desired radio frequency information signal, in part, by comparing the relative energy of the desired radio frequency information signal and total energy of the subspectrum.

* * * * *